United States Patent [19]

Graf et al.

[11] 4,209,454

[45] Jun. 24, 1980

[54] PREPARATION OF HYDROCARBONOXY CONTAINING POLYSILOXANES

[75] Inventors: Werner Graf; Volker Frey; Peter John; Norbert Zeller, all of Burghausen, Fed. Rep. of Germany

[73] Assignee: Wacker-Chemie GmbH, Munich, Fed. Rep. of Germany

[21] Appl. No.: 973,982

[22] Filed: Dec. 28, 1978

[30] Foreign Application Priority Data

Feb. 14, 1978 [DE] Fed. Rep. of Germany ....... 2806036

[51] Int. Cl.$^2$ ........................... C07F 7/04; C07F 7/18
[52] U.S. Cl. ..................................... 556/457; 556/458
[58] Field of Search ................................ 260/448.8 R

[56] References Cited

U.S. PATENT DOCUMENTS

| 3,668,180 | 6/1972 | Brennan et al. | 260/448.8 R X |
| 4,032,557 | 6/1977 | Spörk et al. | 260/448.8 R X |

Primary Examiner—Paul F. Shaver

[57] ABSTRACT

This invention relates to an improved process for preparing polysiloxanes having hydrocarbon radicals bonded to silicon atoms via oxygen, by reacting a halosilane with an alcohol and water in the presence of the desired polysiloxane, the improvement which comprises continuously introducing into a reactor equipped with a column and possibly a reflux condenser and the desired polysiloxane, an alcohol, water and, if necessary, an acid catalyst which promotes the condensation of Si-bonded condensable groups, in an amount such that the reactor contains at least 5 percent by weight of alcohol and 0.001 to 5 percent by weight of catalyst, based on the weight of the alcohol, catalyst and polysiloxane present in the reactor in which the contents of the reactor are heated to the reflux temperature and the halosilane is introduced into the column at least one meter above the bottom of the column while continuously removing the polysiloxane from the reactor at the same rate as it is formed.

5 Claims, No Drawings

PREPARATION OF HYDROCARBONOXY CONTAINING POLYSILOXANES

The present invention relates to an improved process for preparing polysiloxanes and more particularly to a continuous process for preparing polysiloxanes in which hydrocarbon radicals are bonded to silicon atoms via oxygen which comprises reacting a halosilane with an alcohol, water and condensation catalyst in the presence of an organopolysiloxane.

BACKGROUND OF INVENTION

Organopolysiloxanes having hydrocarbonoxy groups linked thereto are well known in the art and their preparation has been described, for example in British Patent 674,137, in which halosilanes have been reacted with alcohol and water in the presence of the desired polysiloxane. The process of the present invention has certain disadvantages over the process described in the above cited British Patent. For example, the process of this invention is easier to control which results in polysiloxanes having a constant, predetermined and controllable number of hydrocarbon radicals bonded to the silicon atoms via oxygen, especially hydrocarbonoxy and Si-bonded hydroxyl groups. Moreover, the resultant polysiloxanes have a lower hydrogen halide content and the process is applicable not only to tetrahalosilanes, but is also applicable to organohalosilanes.

Therefore, it is an object of this invention to provide an improved process for preparing organopolysiloxanes having hydrocarbon groups linked to the silicon atoms via oxygen. Another object of this invention is to provide an improved process for preparing hydrocarbonoxy containing organopolysiloxanes having a constant, predetermined and controlled number of hydrocarbon radicals bonded to the silicon atoms via oxygen. Still another object is to provide an improved process for preparing hydrocarbonoxy containing organopolysiloxanes having a lower hydrogen halide content. A further object of this invention is to provide an improved process for preparing hydrocarbonoxy containing organopolysiloxanes from organohalosilanes.

SUMMARY OF THE INVENTION

The foregoing objects and others which will be apparent from the following description are accomplished generally speaking, by providing an improved process for preparing organopolysiloxanes having hydrocarbon radicals bonded to the silicon atoms via oxygen by reacting a halosilane with an alcohol and water in the presence of the desired polysiloxane, the improvement which comprises continuously introducing into a reactor equipped with a column and possibly a reflux condenser and containing the desired polysiloxane, an alcohol, water and, if necessary, an acid catalyst which promotes the condensation of Si-bonded condensable groups, in an amount such that the reactor always contains at least 5 percent by weight of alcohol and from 0.001 to 5 percent by weight of catalyst, based on the total weight of the alcohol, catalyst and polysiloxane present in the reactor in which the contents of the reactor are maintained at reflux temperature while introducing the halosilane into the column at least 1 meter above the bottom of the column and continuously removing the polysiloxane from the reactor at the same rate as it is formed.

DETAILED DESCRIPTION OF INVENTION

The halosilanes which can be used in the process of this invention are the same halosilanes which could have been used heretofore in previously known processes for preparing polysiloxanes having hydrocarbon radicals which are bonded to silicon via oxygen, from the reaction of a halosilane with alcohol and water. The halosilanes which may be employed in the process of this invention may be represented by the general formula $$R_nSiX_{4-n},$$

where R represents the same or different, monovalent atoms or hydrocarbon radicals, which are inert under the reaction conditions to the alcohol, catalyst and water used, X represents chlorine or bromine, preferably chlorine; and n is 0, 1, 2 or 3, but preferable 0, 1 or 2. Additional examples of halosilanes which may be used in the process of this invention are those having the general formula $$X_{3-m}R_mSiR'SiR_mX_{3-m},$$

where R and X are the same as described above, R' represents a bivalent hydrocarbon radical, for example the ethylene radical or a phenylene radical and m is 0, 1 or 2.

In the above formulas R represents hydrogen and monovalent hydrocarbon radicals having from 1 to 10 carbon atoms. Examples of suitable monovalent hydrocarbon radicals are alkyl radicals such as the methyl, ethyl, n-propyl, n-butyl, sec-butyl, pentyl, octyl and decyl radicals; alkenyl radicals such as the vinyl and allyl radicals; aryl radicals such as the phenyl radical; alkaryl radicals such as the tolyl radicals and aralkyl radicals such as the benzyl radical; as well as substituted, monovalent hydrocarbon radicals having from 1 to 10 carbon atoms which under the prevailing conditions contain atoms that are inert to the alcohol, catalyst and water employed. Examples of substituted monovalent hydrocarbon radicals are haloalkyl radicals in which the carbon atoms to which the halogen is bonded are in an alpha or at least a gamma position to the silicon atoms, such as the gamma-chloropropyl radical and haloaryl radicals, such as the chlorophenyl radicals.

Because of its availability, it is preferred that n represent 0 and that R preferably represents the methyl radical. Preferred halosilanes are the tetrachlorosilane, methyltrichlorosilane and dimethyldichlorosilane. Also, mixtures of various halosilanes may be employed in the process of this invention. When halosilanes are used in which n has a value of 3, then mixtures of at least one such halosilane and at least one halosilane in which n has a value of 0, 1 or 2 must be employed, otherwise polysiloxanes having hydrocarbon radicals bonded to a silicon via oxygen cannot be formed.

The halosilanes can be introduced into the column either as a liquid or as a vapor.

In this invention, it is preferred that alcohols of the following general formula be employed:

$$R''OH$$

where $R''$ is a monovalent, aliphatic hydrocarbon radical having from 1 to 8 carbon atoms.

Except for the vinyl radical, all of the previously cited examples of aliphatic hydrocarbon radicals having from 1 to 8 carbon atoms represented by R are equally applicable for the R" radicals. However alkyl radicals are preferred as the R" radicals. The R" hydrocarbon radicals may also be substituted with atoms or groups which under the reaction conditions of this invention are unreactive with the halosilanes, water and catalyst used. Examples of alcohols which may be employed for the purpose of this invention are methanol, ethanol, n-propanol, isopropanol, beta-methoxyethanol, n-hexanol and 2-ethylhexanol. Also mixtures of various alcohols may be employed in the process of this invention.

It is preferred that the reactor contain a maximum of 60 percent by weight of alcohol, based on the total weight of alcohol, catalyst and the polysiloxane present in the reactor. The presence of larger amounts is not harmful, but it does not result in any particular advantage.

In the process of this invention, water is preferably employed in an amount of from 0.12 to 0.49 mol per gram atom of Si-bonded halogen atom.

Acid catalysts which promote the condensation of Si-bonded condensable groups may be employed. Examples of such catalysts are inorganic and organic acids, such as hydrochloric acid, phosphoric acid and acetic acid; Lewis acids, such as iron trichloride and aluminum trichloride; phosphoronitrile chlorides, as well as acid-activated Fuller's earth and cation exchangers in the H-form.

Mixtures of various catalysts may also be used. The catalyst need not be continuously added to the mixture in the reactor provided it is not removed from the reactor with the desired polysiloxane. When granulated acid-activated Fullers's earth is used as a catalyst, the reactor may be equipped with a screen at the location where the polysiloxane is removed to separate the catalyst from the polysiloxane.

In a preferred embodiment of this invention, a mixture of the desired polysiloxane or polysiloxane containing at least the same number of siloxane units and alkoxy groups as the desired polysiloxane, 5 to 60 percent by weight of alcohol and 0.001 to 5 percent by weight of acid catalyst based on the weight of the polysiloxane, alcohol and catalyst, are heated in the reactor to reflux temperature prior to the addition of the halosilane to the column and prior to the addition of the water to the reactor.

For the purposes of this invention it is possible to employ any of the columns which are generally used for fractional distillations, for example a column filled with packing. Because the halosilane which is to be reacted must be introduced into the column at least one meter above the bottom of the column, the column must be at least 100 cm long. If the column is too short to insure adequate reflux within the column, then it must of course be equipped with a reflux condenser.

The process of this invention is preferably carried out at the pressure of the surrounding atmosphere, i.e., at one bar or at approximately one bar, since operating at normal atmospheric pressure saves the expense which would otherwise be required for the installation of corrosion-resistant pumps. However, if this is required because of the boiling point of the reactants, it is equally possible to operate at lower or higher pressures.

The polysiloxane that is withdrawn from the reactor generally contains unreacted alcohol which can be distilled off with the aid of a film evaporator or a simple distillation apparatus. The alcohol which has been distilled off can then be recycled into the reactor.

If required, the catalysts can be removed from the polysiloxane either before or after the alcohol has been distilled off. The catalysts may be removed, for example by filtering the catalyst through sodium carbonate or zinc shavings.

EXAMPLE 1

Into a 100 liter reactor equipped with a 4 meter long column having a diameter of 10 cm, and filled with 5 mm diameter Raschig rings, are added 50 kg of a mixture containing 69.98 percent by weight of polyethylsilicate having an $SiO_2$ content of 40 percent by weight, 30 percent by weight of ethanol and 0.02 percent by weight of hydrogen chloride and heated to reflux temperature. About 12 liters of ethanol, 0.6 liters of water and 0.02 liters of concentrated hydrochloric acid are introduced into the reactor per hour and 10 liters of silicon tetrachloride are fed into the column per hour at a point 3.50 meters above the bottom of the column, while the polysiloxane is continuously withdrawn from the reactor as it is formed. The polysiloxane withdrawn from the first reactor is transferred to a second reactor where it is heated to 160° C. to separate the unreacted ethanol which is then recycled into the first reactor where it is reacted with the halosilane. The recycled ethanol is a portion of the previously mentioned 12 liters per hour which is introduced into the reactor.

The polyethylsilicate thus obtained has a viscosity of 4 cs at 23° C., an $SiO_2$ content of 40 percent by weight and contains 1.5 percent by weight of Si-bonded hydroxyl groups. The HCl content is 20 mg/liter.

EXAMPLE 2

The procedure described in Example 1 is repeated, except that 0.2 liters of concentrated hydrochloric acid are added to the reactor per hour.

The polyethylsilicate thus obtained has an $SiO_2$ content of 40 percent by weight and contains 0.7 percent by weight of Si-bonded hydroxyl groups with an HCl content of 150 mg/liter.

EXAMPLE 3

The procedure described in Example 1 is repeated, except that 0.35 liters of water and 1 gram of iron trichloride are introduced per hour into the reactor.

The polyethylsilicate thus obtained has an $SiO_2$ content of 35 percent by weight and contains 0.15 percent by weight of Si-bonded hydroxyl groups with an HCl contant of 200 mg/liter.

EXAMPLE 4

Into a 100 liter reactor equipped with a 4 meter long column having an inside diameter of 10 cm and which contains 5 mm diameter Raschig rings, are added 50 kg of a mixture consisting of 70 percent by weight of monomethylethoxypolysiloxane having the average formula: $CH_3SiO_{1.1}(OC_2H_5)_{0.8}$, 29.99 percent by weight of ethanol and 0.01 percent by weight of hydrogen chloride. The mixture is heated to reflux temperature and then 5 liters of ethanol, 0.4 liters water and 0.01 liters of concentrated hydrochloric acid are added per hour to the reactor. At a point 3.50 meters above the bottom of the column, 10 liters per hour of methyltrichlorosilane are added while continuously removing the polysiloxane from the reactor as it is being generated. The polysiloxane withdrawn from the reactor is then heated in a second reactor to 160° C. to distill off the unreacted ethanol. The ethanol which has been distilled off is then recirculated to the reactor where it is reacted with the halosilane. The recycled ethanol is a portion of the previously referred to 5 liters per hour.

The monomethylethoxypolysiloxane thus obtained has a viscosity of 25 cs at 23° C. and contains 0.15 percent by weight of Si-bonded hydroxyl groups with an HCl content of 40 mg/liter The residue is about 60 percent by weight $SiO_2$.

COMPARISON EXAMPLE 1

The procedure described in Example 1 is repeated, except that the mixture which is initially heated in the reactor contains only 3 percent by weight of ethanol. After a short period of operation, the polysiloxane withdrawn from the reactor is turbid, due to the fact that silicon dioxide is being precipitated in a very fine form and its separation can be achieved only with extreme difficulty. The HCl content of the resulant polysiloxane is 20 mg/liter.

COMPARISON EXAMPLE 2

The procedure described in Example 1 repeated, except that the continuous addition of concentrated hydrochloric acid is omitted. The polysiloxane withdrawn from the reactor is increasingly viscous and after 2 hours of operation, the polysiloxane gelled in the reactor.

COMPARISON EXAMPLE 3

Using a process which is similar to that described in Example 1 of British Pat. No. 674,137, two addition funnels are used for the simultaneous addition of methyltrichlorosilane at the rate of 200 m per hour and a mixture consisting of 12.5 parts by weight of ethanol and 1 part by weight of water at the rate of 108 ml per hour, to a mixture heated to 45° C. containing 100 gm of monomethylethoxypolysiloxane having an average formula $CH_3SiO_{1.1}(OC_2H_5)_{0.8}$ and 100 gm of ethanol in a 500 ml glass flask with agitation. The product is then withdrawn via an overflow. The flask's contents gel after only 15 minutes.

COMPARISON EXAMPLE 4

In accordance with Example 1 of British Pat. No. 674,137, two addition funnels are used for the simultaneous addition of 320 ml of silicon tetrachloride and 800 ml of a mixture containing 95 percent by weight of ethanol and 5 percent by weight of water, to 230 ml of polyethylsilicate having an $SiO_2$ content of 40 percent by weight which has been heated to 45° C. in a 2-liter glass flask. The addition is completed under constant stirring over a period of 5 minutes. The glass flask is connected to a reflux condenser and when the addition of the silicon tetrachloride and the ethanol-water mixture has been completed, the excess alcohol is distilled off by heating to 150° C.

The polyethylsilicate thus obtained has an $SiO_2$ content of 44 percent by weight, contains 1.400 mg/liter of HCl and less than 0.1 percent by weight of Si-bonded hydroxyl groups.

What is claimed is:

1. An improved process for preparing polysiloxanes having hydrocarbon radicals bonded to silicon atoms via oxygen by reacting a halosilane with an alcohol and water in the presence of an organopolysiloxane, the improvement which comprises continuously introducing the organopolysiloxane, alcohol, water and an acid catalyst which promotes the condensation of Si-bonded condensable groups into a reactor equipped with a column in such an amount that the reactor always contains at least 5 percent by weight of alcohol and from 0.001 to 5 percent by weight of catalyst, based on the total weight of the alcohol, catalyst and organopolysiloxane present in the reactor, maintaining the contents of the reactor at reflux temperature while introducing the halosilane into the column at least 1 meter above the bottom of the column while continuously removing the organopolysiloxane from the reactor at the same rate as it is formed.

2. The process of claim 1, in which the alcohol is introduced into the reactor at a rate such that the reactor contains no more than 60 percent by weight of alcohol, based on the total weight of alcohol, catalyst and polysiloxane.

3. The process of claim 1, in which the organopolysiloxane, from 5 to 60 percent by weight of alcohol and 0.001 to 5 percent by weight of acid catalyst based on the weight of the organopolysiloxane, alcohol and catalyst is heated to reflux temperature prior to the addition of the water into the reactor and the halosilane into the column.

4. The process of claim 1, in which the organopolysiloxane introduced into the reactor contains alkoxy groups.

5. The process of claim 3, in which the organopolysiloxane introduced into the reactor contains alkoxy groups.

* * * * *